United States Patent
Lamoureux et al.

(10) Patent No.: US 12,454,114 B2
(45) Date of Patent: Oct. 28, 2025

(54) GLAZED UNIT COMPRISING SEVERAL CONTIGUOUS SHEETS AND METHOD FOR MANUFACTURING SAID GLAZED UNIT

(71) Applicant: SAINT-GOBAIN GLASS FRANCE, Courbevoie (FR)

(72) Inventors: Laurent Lamoureux, Ribecourt-Dreslincourt (FR); Frédéric Berthe, Cambronne les Ribecourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 43 days.

(21) Appl. No.: 18/552,325

(22) PCT Filed: Mar. 23, 2022

(86) PCT No.: PCT/FR2022/050544
§ 371 (c)(1),
(2) Date: Sep. 25, 2023

(87) PCT Pub. No.: WO2022/200737
PCT Pub. Date: Sep. 29, 2022

(65) Prior Publication Data
US 2024/0017518 A1    Jan. 18, 2024

(30) Foreign Application Priority Data

Mar. 26, 2021 (FR) ...................................... 2103120

(51) Int. Cl.
*B32B 3/10* (2006.01)
*B32B 7/12* (2006.01)
*B32B 17/10* (2006.01)

(52) U.S. Cl.
CPC ................ *B32B 3/10* (2013.01); *B32B 7/12* (2013.01); *B32B 17/10009* (2013.01); *B32B 2307/412* (2013.01); *B32B 2307/514* (2013.01)

(58) Field of Classification Search
CPC .. B32B 3/10; B32B 3/08; B32B 3/085; B32B 7/12; B32B 17/10009; B32B 17/10036;
(Continued)

(56) References Cited

U.S. PATENT DOCUMENTS 2,572,947 A    10/1951  Pevney

FOREIGN PATENT DOCUMENTS

CN              2521335 Y  * 11/2002
WO    WO 2006/064153 A1     6/2006
(Continued)

OTHER PUBLICATIONS

Translation of CN2521335Y. (Year: 2002).*
International Search Report as issued in International Patent Application No. PCT/FR2022/050544, dated Jun. 30, 2022.

*Primary Examiner* — Catherine A. Simone
(74) *Attorney, Agent, or Firm* — Pillsbury Winthrop Shaw Pittman LLP

(57) ABSTRACT

A glazed unit for a vehicle of transport and its manufacturing method, the glazed unit including a first exterior sheet and a second exterior sheet, contiguous, with an exterior separating space therebetween, a first interior sheet and a second interior sheet, contiguous, with an interior separation space therebetween at least one interlayer sheet of adhesive material, wherein, seen in cross-section, the exterior separation space and the interior separation space are offset by an offset distance.

15 Claims, 2 Drawing Sheets

(58) Field of Classification Search
CPC .......... B32B 17/1055; B32B 2307/412; B32B 3/266; B60J 1/001; B60J 1/008; B60J 1/06; E06B 3/02
USPC .................... 428/58, 60, 134, 136, 188, 189
See application file for complete search history.

(56) References Cited

FOREIGN PATENT DOCUMENTS

| | | |
|---|---|---|
| WO | WO 2018/178574 A1 | 10/2018 |
| WO | WO 2021/009356 A1 | 1/2021 |

* cited by examiner

[Fig.1]
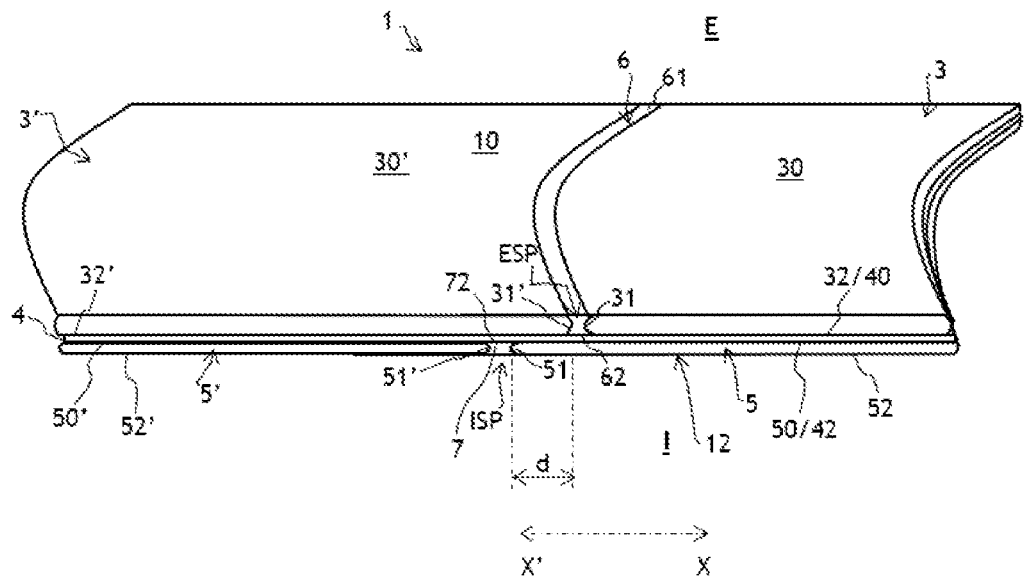
[Fig.2]
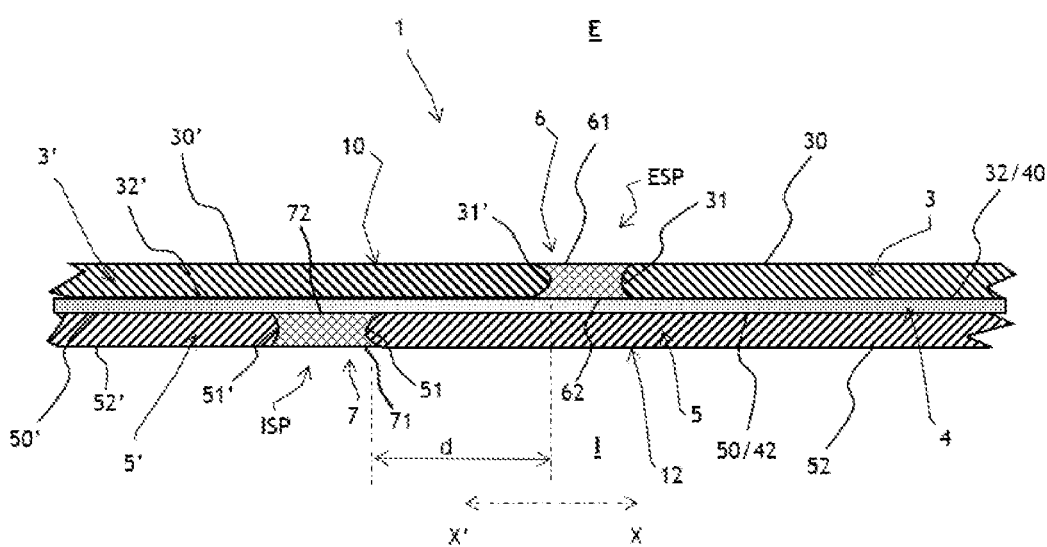

[Fig.3]
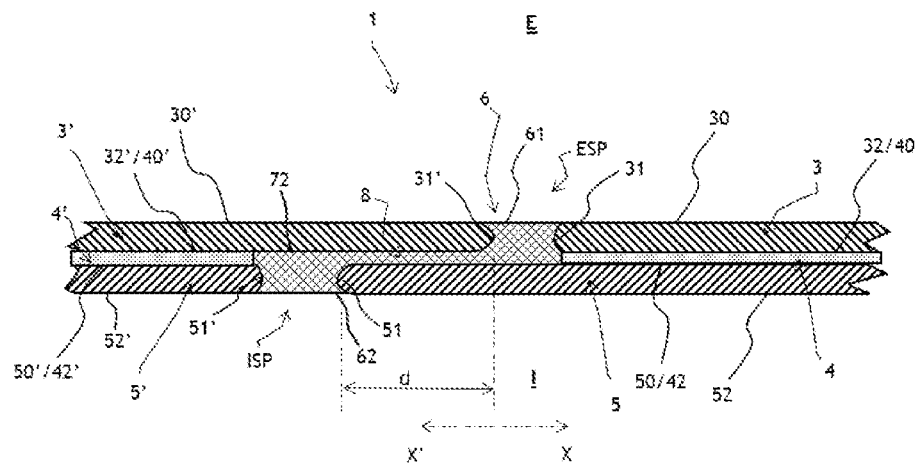
[Fig.4]
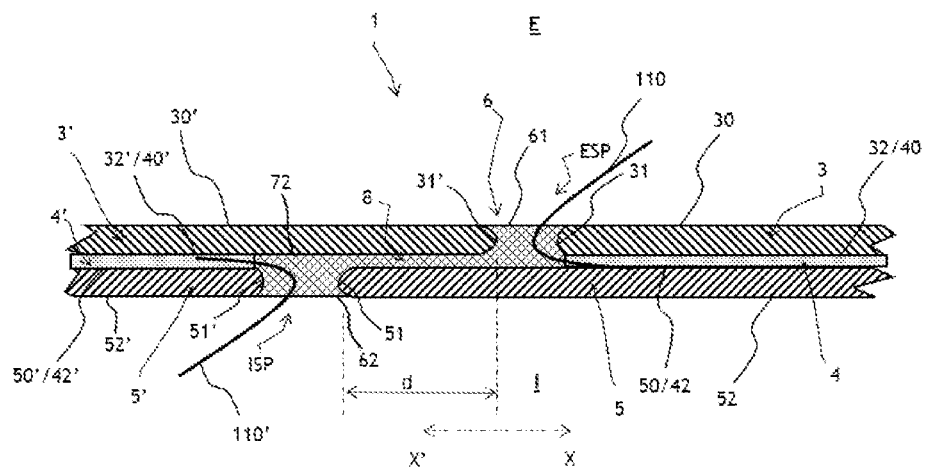
[Fig.5]
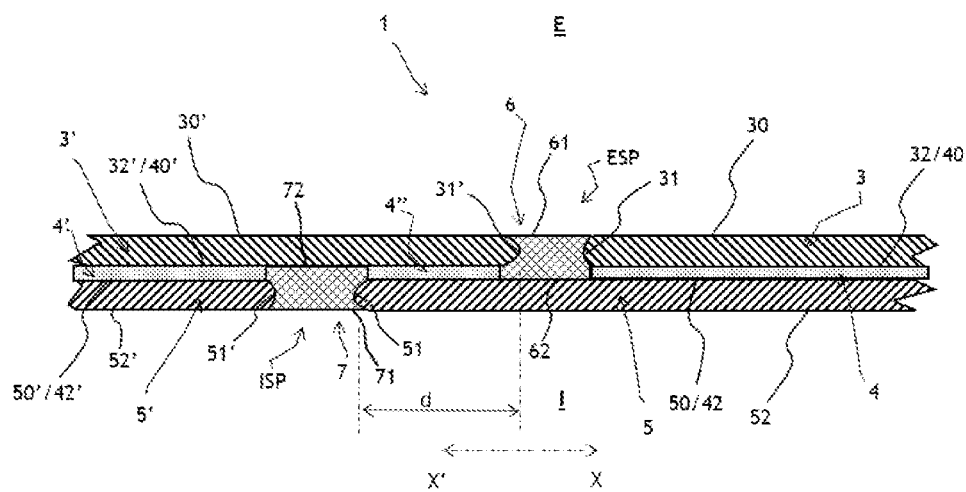

GLAZED UNIT COMPRISING SEVERAL CONTIGUOUS SHEETS AND METHOD FOR MANUFACTURING SAID GLAZED UNIT

CROSS-REFERENCE TO RELATED APPLICATIONS

This application is the U.S. National Stage of PCT/FR2022/050544, filed Mar. 23, 2022, which in turn claims priority to French patent application number 2103120 filed Mar. 26, 2021. The content of these applications are incorporated herein by reference in their entireties.

The invention relates to a glazed unit for a means of transport, in particular a vehicle, and particularly a motor vehicle, comprising at least twice two contiguous sheets and at least one interlayer sheet of adhesive material, as well as a method for manufacturing said glazed unit.

Glazed units comprising a first glass pane and a second glass pane assembled side-by-side are known from the prior art in order to ultimately form only one glazed unit. Such an assembly is of interest when it is desired to obtain a glazed unit of complex shape. It may, for example, be a glazed unit for a motor vehicle having significant bending along a first axis of curvature and very low bending along a second axis, perpendicular to the first. Such a glazed unit comprises for example both the windshield and a panoramic roof glass pane of the vehicle or both the windshield and fixed front side glass panes of the vehicle or even both a roof and a fixed rear glass pane of the vehicle. Bending methods implemented in the glass industry make it possible to obtain a single-piece glazed unit having a relatively low bending. For glazed units having relatively high bending, it is preferable to assemble a first glass pane and a second glass pane by means of an assembly device in order to simplify production thereof.

There are known in the prior art, and in particular the international patent applications solutions that juxtapose glass panes, and in particular for vehicles, where a first glass pane and a second glass pane juxtaposed or contiguous to the first are assembled side-by-side thanks to an assembly system.

International patent application No. WO 2006/064153 discloses an assembly system wherein a rigid profile portion is fixed to a first glass pane and has a protruding part to support the second glazed element. In practice, this profile, due to its rigidity, is difficult to implement and can only be suitable when the adjacent edges of the glass panes are completely rectilinear.

International patent application No. WO 2018/178574 discloses another solution for such a glazed unit with a first glass pane and a second glass pane assembled side-by-side. It comprises two contiguous glass panes and two profiled bodies arranged facing each other and each located in contact with a part of the edge surface of one of said glass panes. The glazed unit further comprises one, or even two, flexible exterior covering(s) having an exterior face arranged in the continuity of an exterior face of the glass pane. Thus, the glazed unit comprises a flush joint on its exterior face, consequently improving its aesthetic. The disadvantage of the configuration described in this document is that the interior face of the glazed unit has an unsightly protuberance due to the assembly means implemented. In addition, the assembly requires restrictive bonding operations that may cause sealing problems.

U.S. Pat. No. 2,572,947 discloses the production of several aircraft glazed units side-by-side, each glazed unit being separated from each other by an upright. Exterior and interior notches are provided in an over thickness of the interlayer sheets to allow the positioning of exterior and interior uprights. The cross-sectional FIGS. 12 to 14 and 17 of this document illustrate two separate glazed units, side-by-side and separated by an upright. The presence of this upright is unsightly and generates additional weight for the vehicle.

One aim of the invention is to overcome the disadvantages of the prior art by proposing a glazed unit comprising at least two contiguous glass sheets, this glazed unit comprising at least five sheets assembled two-by-two and having an improved aesthetic, in particular with an edge-to-edge connection between the contiguous sheets which is discreet, while having a high mechanical strength and a low weight.

The present invention is particularly suitable when the facing edges of two contiguous sheets are curved, that is to say when these edges have in space a non-straight configuration transversely to the edges of the sheets which are facing each other, with at least one curve, or even a plurality of curves, one inward and the other outward, when the totality of the length of two adjacent sheet edges is considered.

To do so, the present invention thus relates, in its broadest sense, to a glazed unit of a means of transport, particularly a vehicle, according to claim 1.

This glazed unit has an exterior face intended to be oriented toward an exterior space and an interior face intended to be oriented toward an interior space, said glazed unit comprising:
- a first exterior sheet and a second exterior sheet, contiguous with one another, each having an exterior face oriented toward said exterior space, an edge face facing one another with an exterior separation space therebetween, and an interlayer face,
- a first interior sheet and a second interior sheet, contiguous with one another, each having an interlayer face, an edge face facing one another with an interior separation space therebetween, and an interior face oriented toward said interior space,
- at least one interlayer sheet of adhesive material located between one of said exterior sheets and one of said interior sheets, said glazed unit being remarkable in that, seen in cross-section, said exterior separation space and said interior separation space are offset by an offset distance; this offset is such that both further toward the interior than the exterior separation space is the first interior sheet, and that further toward the exterior than the interior separation space is the second exterior sheet.

Said offset distance, that is to say the distance closest to, for this cross-sectional view, between the two spaces is preferably between 5.0 and 100.0 mm, preferably between 10.0 and 90.0 mm, or even between 15.0 and 70.0 mm. This distance is relatively small in order to limit the shearing effects that could appear between said glass sheets.

Said exterior separation space and said interior separation space are not at all one above the other in the exterior/interior direction; said exterior separation space and said interior separation space do not overlap in the exterior/interior direction; an offset excludes an overlap.

As usual, within the meaning of the present invention, when an opening upright is located facing the totality of the thickness of a glazed unit, then this upright constitutes a limit to the glazed unit and if a glazed element is located on the other side of this upright, then it is another glazed unit; in the context of the invention, there is no upright which passes through the totality of the thickness of a glazed unit according to the invention. In other words, neither said exterior separation space nor said interior separation space comprises an upright for attaching the glazed unit. Such an upright is both too visible and generates an additional weight for the vehicle.

Said first exterior sheet and said second exterior sheet are contiguous along an edge which is preferably non-rectilinear.

Said first interior sheet and said second interior sheet are contiguous along an edge which is preferably non-rectilinear.

Said exterior separation space preferably comprises an exterior seal which has an exterior face which is preferably flush with said exterior face of the first exterior sheet and/or said exterior face of the second exterior sheet.

Said interior separation space preferably comprises an interior seal which has an interior face which is preferably flush with said interior face of the first interior sheet and/or said interior face of the second interior sheet.

For the purposes of the present invention, "flush" should be understood to mean that at the junction between an exterior or interior sheet and the seal, seen in cross-section, the seal does not extend farther toward the exterior, nor further to the interior, respectively, than a flush line that would be in the continuity of the sheet curve at this junction.

Said exterior face of the exterior seal and/or said interior face of the interior seal is straight or curved; it(s) is (or are) preferably in the continuity of the curvature of each face and meet in the middle of the inter-sheet space.

The glazed unit is thus designed such that in the installed state, in the vehicle, no bodywork upright, nor any masking element is installed facing the interior face of said interior seal and/or the exterior face of said exterior seal.

In the group comprising said first exterior sheet, said second exterior sheet, said first interior sheet and said second interior sheet, each sheet is preferably made of glass; however, it is possible for one (or more) of these sheets itself to be made of plastic material, such as for example based on, or made of, polycarbonate. The advantage of the present invention when all these sheets are made of adhesive material is lower. Each sheet is monolithic.

The interior face of said interior seal and/or the exterior face of said exterior seal may be called "free" because it (they) is (or are) visible respectively from an interior space of the vehicle and from a space outside the vehicle.

Said seal is preferably made of a single material between its exterior face and its interior face; this material may be multi-component in the sense that its chemical analysis can reveal the presence of several chemical components; however, the material analysis of the seal finds that it is made of a single material.

Preferably, said exterior seal and/or said interior seal is made of translucent or even transparent material.

Said seal preferably comprises no insert.

In a particular variant, the glazed unit in the installed state does not comprise any bead of glue under the interior face of the edge of each interior glass sheet or under an interior face of the seal.

Advantageously, the thickness of an exterior sheet may be between 2.85 mm and 4.85 mm. Preferably, an exterior sheet made of glass has surface stresses between 80 and 200 MPa for a thickness of said glass exterior sheet of between 2.85 and 4.85 mm.

Advantageously, an exterior glass sheet may have surface stresses at most of 20 MPa, 30 MPa, 40 MPa, and 60 MPa, respectively, for a thickness of said exterior glass sheet of about 1.1 mm, about 1.6 mm, about 2.1 mm and about 2.6 mm, respectively. The term "about" here refers to a value considered by the person skilled in the art to be a standard value, even if locally this value can vary within a range of plus or minus 10%.

Advantageously, the thickness of an interior sheet may be between 0.30 mm and 2.60 mm. It may in particular be between 0.70 mm and 2.10 mm, or even between 1.0 mm and 1.60 mm. In a preferred embodiment of the present invention, the thickness of said interior glass sheet is between 1.00 mm and 1.20 mm.

In one variant, the interior glass sheet may be a glass sheet having undergone a chemical tempering operation and having a thickness between 0.30 and 1.60 mm, or even between 0.50 and 1.50 mm, or even between 0.70 and 1.20 mm, for example 1.10 mm. A chemical tempering operation allows surface stresses of at least 200 MPa to be introduced.

It is thus possible to mix exterior and interior sheets very easily in the glazed unit with different thicknesses and/or different mechanical characteristics.

The interlayer sheet of adhesive material is, for example, a polyvinylbutyral (PVB) sheet that is between 0.30 and 1.50 mm thick, for example 0.76 mm thick.

In a particular embodiment, said interlayer sheet of adhesive material is made of one piece and is located (extending) on the one hand between said first exterior sheet and said first interior sheet and on the other hand between said second exterior sheet and said second interior sheet.

In a particular variant, said exterior seal and said interior seal are connected by a seal interlayer portion located between said second exterior sheet and said first interior sheet.

In another particular variant, said exterior seal is in contact with said interlayer face of the first interior sheet and/or said interior seal is in contact with said interlayer face of the second exterior sheet.

In another particular variant, an additional portion of a sheet of adhesive material is located between said exterior seal and said interior seal; this may be an additional portion of an interlayer sheet of adhesive material, in the same material as an interlayer sheet of adhesive material, or an additional portion of glue.

The present invention also relates to a method for manufacturing glazed units for a means of transport, in particular a vehicle, according to the invention. Said glazed units have an exterior face intended to be oriented toward an exterior space and an interior face intended to be oriented toward an interior space, said glazed units comprising:
- a first exterior sheet and a second exterior sheet, contiguous with one another, each having an exterior face oriented toward said exterior space, an edge face facing one another with an exterior separation space therebetween, and an interlayer face,
- a first interior sheet and a second interior sheet, contiguous with one another, each having an interlayer face, an edge face facing one another with an interior separation space therebetween, and an interior face oriented toward said interior space,
- at least one interlayer sheet of adhesive material located between one of said exterior sheets and one of said interior sheets.

Said method is remarkable in that, in order to produce, seen in cross-section, said exterior separation space and said interior separation space offset by an offset distance:
- said interlayer sheet of adhesive material is made from one piece and said glazed unit is assembled by a single lamination operation, or at least two interlayer sheets of adhesive material are arranged contiguous and said glazed unit is assembled by two separate lamination operations or by a single lamination operation.

Thus, the inventors realized that, surprisingly, it was possible to produce a laminated glazed unit of a novel type, wherein, along one edge, the edge face of two contiguous exterior sheets is not in the extension of the edge face of two contiguous interior sheets, seen in cross-section in the exterior-interior direction, but that each of the four edge faces is offset.

With this offset, it is possible to produce a glazed unit which in itself is laminated, thanks to the presence of at least one interlayer sheet of adhesive material between the exterior and interior sheets, and therefore very resistant, while having an overall configuration (in particular a bending) which is not achievable with known lamination methods and while having an overall appearance of a single-piece glazed unit.

Advantageously, the total view of the glazed unit according to the invention is very large because two contiguous edges of exterior sheets or two contiguous edges of interior sheets are connected only by an exterior or interior seal; these sheets are not intended to be bonded to a body upright and it is therefore not necessary to provide for an opaque (often enameled) band to protect this bonding from ultraviolet rays.

The glazed unit according to the invention can make it possible to produce both the windshield and a panoramic roof glazed unit of a vehicle, or both the windshield and fixed front side glass panes of a vehicle or even both a roof and a fixed rear glass pane of a vehicle, or even the combinations of these possibilities.

Advantageously, the present invention is intended for a rolling vehicle and is not intended for a flying vehicle, such as an airplane or a helicopter, since the mechanical strength constraints of a glazed unit for a flying vehicle are very high.

Described below, by way of non-limiting examples, will be several embodiments of the present invention referring to the appended figures in which:

FIG. 1 schematically shows a schematic, perspective view of a first embodiment of a glazed unit according to the invention;

FIG. 2 schematically shows a partial cross-sectional view of the first embodiment of the glazed unit of FIG. 1;

FIG. 3 schematically represents a partial cross-sectional view of a second embodiment of a glazed unit according to the invention;

FIG. 4 schematically represents a view of a variant of the second embodiment of a glazed unit according to the invention; and FIG. 5 schematically represents a partial transverse cross-sectional view of a third embodiment of a glazed unit according to the invention.

The present invention is described by way of example in the context of an application as a vehicle glazed unit. This glazed unit closes an opening by providing the separation between an exterior space E which is outside the vehicle, and an interior space I which is inside the vehicle. The ideas of "exterior" and "interior" are therefore considered relative respectively to the exterior space E and the interior space I.

The present invention is described, by way of non-limiting example, by being applied to a windshield glazed unit and a vehicle panoramic roof, and in particular of a motor vehicle. Thus, in the illustrative figures, the glazed unit is shown schematically, flat in FIG. 1 and in vertical sectional views in FIGS. 2 to 5, installed in a bodywork opening (not visible).

In the context of the present document, FIGS. 1 to 5 show the central longitudinal axis of advance of the vehicle equipped with the glazed unit according to the invention as windshield and roof glazed unit, generally called the axis X-X' of the vehicle.

With reference to FIG. 1, a glazed unit 1 comprising a first part, on the left, which can thus be likened to a windshield and a second part, on the right, which can thus be likened to a vehicle roof glazed unit, is schematically shown. This glazed unit 1 therefore has an exterior face 10 oriented toward the exterior space E, an interior face 12 oriented toward the interior space I and a peripheral edge face, located between these two faces.

The glazed unit 1 comprises:
 a first exterior sheet 3 and a second exterior sheet 3', contiguous with one another, here made of glass, each having an exterior face 30, 30' oriented toward the exterior space E, an edge face 31, 31' facing one another with an exterior separation space ESP therebetween, and an interlayer face 32, 32',
 a first interior sheet 5 and a second interior sheet 5', contiguous with one another, here made of glass, each having an interlayer face 50, 50', an edge face 51, 51' facing one another with an interior separation space ISP therebetween, and an interior face 52, 52' oriented toward the interior space I,
 at least one interlayer sheet of adhesive material 4, 4' located on the one hand between the exterior sheets 3, 3' and on the other hand between the interior sheets 5, 5'. There may be a plurality of contiguous sheets of adhesive material 4, 4' in the glazed unit 1, as explained below.

Each exterior sheet 3, 3' has an exterior face 30, 30' which is oriented toward the exterior E and therefore together corresponding to the exterior face 10 of the glass pane 1, an interlayer face 32, 32' which is oriented toward the interlayer sheet of adhesive material 4, 4' and an edge face 31, 31' located between these two faces.

Each interior sheet 5, 5' has an interlayer face 50, 50' which is oriented toward the interlayer sheet of adhesive material 4, 4', an interior face 52, 52' which is oriented toward the interior space I and therefore corresponding to the interior face 12 of the glass pane 1, and an edge face 51, 51' located between these two faces.

Each interlayer sheet of adhesive material 4, 4' has an exterior interlayer face 40, 40' which is oriented toward the interlayer face 32, 32' and that herein makes contact with this interlayer face 32, 32', an interior interlayer face 42, 42' which is oriented toward the interlayer face 50, 50' and that herein is in contact with this interlayer face 50, 50' as well as an edge 41, 41' that is located between these two interlayer faces 40, 42 and 40', 42'.

Rounded edge faces are shown. Alternatively, one, several, or all the edge faces are straight. The glazed unit is said to be a laminated glazed unit in the sense that there is no gaseous space or empty space between the sheets that constitute it in the exterior-interior transverse direction.

The exterior sheets preferably have an identical thickness and the interior sheets preferably have an identical thickness in order to facilitate the positioning of one relative to others during the assembly and the manufacture of the glazed unit 1.

In the transverse cross-sectional plane of the glazed unit, in the general direction of the plane of the glazed unit (perpendicular to the interior-exterior direction) the exterior sheets are contiguous and the interior sheets are contiguous.

According to the invention, when the glazed unit is observed in this cross-section, transversely to a joining edge between the windshield part and the roof part, the exterior separation space ESP which is located between the exterior sheets and the interior separation space ISP which is located between the interior sheets are not one in the continuity of the other in the exterior-interior direction but are offset by an offset distance d.

Thus, in the transverse cross-sectional plane of the glazed unit, in the interior-exterior direction, the exterior separation space ESP and the interior separation space ISP are non-contiguous.

The offset distance d is thus the distance, at the shortest, between the edge face 31' of the second exterior sheet 3' and the edge face 51 of the first interior sheet 5, as shown in the figures.

Thus, at the same time:
- the first interior sheet 5 (and not the interior separation space ISP) is farther inside than the exterior separation space ESP, and
- the second exterior sheet 3 (and not the exterior separation space ESP) is farther outside than the interior separation space ISP.

The exterior separation space ESP and the interior separation space ISP each has a width (here along the axis X-X'), preferably between 1.0 and 50.0 mm, preferably between 1.0 and 40.0 mm, or even between 1.0 and 10.0 mm. For example, it may be 4.0 mm for each of the two.

This offset distance d must be sufficient for the two separation spaces to appear separate from one another, and to thus be more discrete, without however being too great, keeping adequate mechanical strength of the glazed unit 1 in its entirety. Here, it is along the axis X-X'. It is preferably between 5.0 and 100.0 mm, preferably between 10.0 and 90.0 mm, or even between 15.0 and 70.0 mm. For example, it may be 25.0 mm. It is preferably greater than the total thickness of the glazed unit 1.

With reference to FIG. 1, it is preferably identical over the entire width in question (transversely to the axis X-X').

FIG. 1 shows in particular a glazed unit configuration that is particularly suitable for the invention wherein when the totality of the length of two adjacent sheet edges is considered (that is to say here according to the vertical in FIG. 1), the adjacent edges of the sheets which are facing each other are not rectilinear, with at least one curve, or even several curves, one inward and the other outward.

The exterior separation space ESP here comprises an exterior seal 6 which has an exterior face 60 which is preferably flush with said exterior face 30 of the first exterior sheet 3 and/or said exterior face 30' of the second exterior sheet 3'.

The interior separation space ISP here comprises an interior seal 7 which has an interior face 72 which is preferably flush with said interior face 52 of the first interior sheet 5 and/or said interior face 52' of the second interior sheet 5'.

The exterior seal 6 and/or the interior seal 7 is (or are) preferably made of translucent or even transparent material. In order to facilitate manufacture, they may be made of the same material.

The seal(s) 6, 7 is or are preferably made of adhesive material in order to achieve adequate sealing and are preferably carried out during the manufacture of the glazed unit 1. The material of the seal 6, 7 may be based on, or made of, polyurethane, or be based on, or made of PVB, in particular PVB that can be applied in fluid form.

The seal 6 thus has an exterior face 61 oriented toward the exterior space E, and an interior face 62, oriented toward the interior space I. The exterior face 61 is preferably substantially flush with the exterior face 10 of the glazed unit 1. Thus, the exterior face 61 is substantially in the continuity of the exterior faces 30, 30' of two exterior sheets 3, 3'. The exterior face 61 does not protrude farther toward the outside than the exterior faces 30, 30' of the two exterior sheets 3, 3'. This configuration is also called "flush". The gap between the exterior face 61 and the exterior faces 30, 30' is between 0 and 0.5 mm.

Furthermore, the interior face 72 of the interior seal 7 is substantially flush with the interior face 12 of the glazed unit 1. Thus, the interior face 72 is substantially in the continuity of the interior faces 52, 52' of two interior sheets 5, 5'. The interior face 72 does not protrude farther toward the interior than the interior faces 52, 52' of the two interior sheets 5, 5'. The gap between the interior face 72 and the interior faces 52, 52' is between 0 and 0.5 mm.

The glazed unit 1, according to the invention, has the advantage of having two junctions (an exterior junction in the environment of the exterior separation space ESP and an interior junction in the environment of the interior separation space ISP) which are separated from one another and each more discrete than in the glazed units of the prior art; they are also more discrete assemblies than in the glazed units of the prior art. The aesthetics of the glazed unit 1 are consequently improved.

Furthermore, the assembly is relatively simple to implement (in particular when the offset is not too large). It is also possible to form a glazed unit 1 having relatively complex shapes.

With reference to FIG. 2, in a first embodiment, the interlayer sheet of adhesive material 4 is unique, made from one piece, and is located both on the one hand between the first exterior sheet 3 and the first interior sheet 5 and on the other hand between the second exterior sheet 3' and the second interior sheet 5'; the interior face 62 of the exterior seal 6 is in contact with the exterior interlayer face 40 of the interlayer sheet of adhesive material 4 and the exterior face 70 of the interior seal 7 is in contact with the interior interlayer face 42 of the interlayer sheet of adhesive material 4.

However, it is possible for at least one other sheet to be interposed between on the one hand the exterior sheets 30, 30' and on the other hand the interlayer sheet of adhesive material 4 or between on the one hand the interlayer sheet of adhesive material 4 and on the other hand the interior sheets 5, 5'.

As an alternative to what is shown for this first embodiment, the glazed unit 1 can comprise two contiguous interlayer sheets of adhesive material 4, 4', with their edge faces in contact with one another. This contact may be located, for example, between the environment of the exterior separation space ESP and the environment of the interior separation space ISP, that is to say in the exterior-interior direction, between the second exterior sheet 3' and the first interior sheet 5.

With reference to FIG. 3, a glazed unit 1 according to a second embodiment of the present invention is schematically shown. This second embodiment is an alternative to the first embodiment of the invention. Consequently, in order to avoid redundant description, elements and common references with the first embodiment are not described again in the description of this second embodiment.

The glazed unit 1 includes two contiguous interlayer sheets of adhesive material 4, 4', separated from each another, located for one, further inside than the first exterior sheet 3 and for the other, further outside than the second interior sheet 5'.

The exterior seal 6 is in contact with the interlayer face 50 of the first interior sheet 5 and the interior seal 7 is in contact with the interlayer face 32' of the second exterior sheet 3'.

The exterior seal 6 and the interior seal 7 are connected by a seal interlayer portion 8 which is located between the second exterior sheet 3' and the first interior sheet 5. Preferably, the exterior seal 6, the seal interlayer portion 8 and the interior seal 7 are made of the same material and are a single seal portion.

FIG. 4 also shows that it is possible to pass one or more electrical connectors 110, 110' from the interior space or from the exterior space to one and/or the other of the interlayer sheets of adhesive material 4, 4' through the seal interlayer portion 8. This can also be envisaged through the exterior seal 6 and/or interior seal 7 in other variants. This may be very practical for connecting an electronic part such as a signal lamp or a vehicle guidance system part (for example LIDAR).

With reference to FIG. 5, a glazed unit 1 according to a third embodiment of the present invention is schematically shown. This third embodiment is an alternative to the second embodiment of the invention. Consequently, in order to avoid redundant description, elements and common references with the second embodiment are not described again in the description of this third embodiment.

As for the second embodiment, the glazed unit 1 comprises two contiguous sheets of adhesive material 4, 4', separated from each another, located for one, further inside than the first exterior sheet 3 and for the other, further outside than the second interior sheet 5'.

As for the second embodiment, the exterior seal 6 is in contact with said interlayer face 50 of the first interior sheet 5 and said interior seal 7 is in contact with said interlayer face 32' of the second exterior sheet 3'.

An additional portion of the interlayer sheet of adhesive material 4" is located between the exterior seal 6 and the interior seal 7. It is in this case in the same material as the interlayer sheets of adhesive material 4, 4'.

The different embodiments presented above may be combined with some or all of the others along the edge considered.

The invention claimed is:

1. A glazed unit for a means of transport, having an exterior face intended to be oriented toward an exterior space and an interior face intended to be oriented toward an interior space, said glazed unit comprising:
   a first exterior sheet and a second exterior sheet, contiguous with each other, each having an exterior face oriented toward said exterior space, an edge face facing each other with an exterior separation space therebetween, and an interlayer face,
   a first interior sheet and a second interior sheet, contiguous with each other, each having an interlayer face, an edge face facing each other with an interior separation space therebetween, and an interior face oriented toward said interior space,
   at least one interlayer sheet of adhesive material located between one of said first and second exterior sheets and one of said first and second interior sheets,
   wherein, seen in cross-section, said exterior separation space and said interior separation space are offset by an offset distance, and
   wherein said offset distance is between 5.0 and 100.0 mm.

2. The glazed unit according to claim 1, wherein said exterior separation space comprises an exterior seal which has an exterior face.

3. The glazed unit according to claim 2, wherein said interior separation space comprises an interior seal which has an interior face.

4. The glazed unit according to claim 3, wherein said exterior seal and/or said interior seal is made of translucent or even transparent material.

5. The glazed unit according to claim 1, wherein said interlayer sheet of adhesive material is made from one piece and is located between said first exterior sheet and said first interior sheet and between said second exterior sheet and said second interior sheet.

6. The glazed unit according to claim 3, wherein said exterior seal and said interior seal are connected by a seal interlayer portion located between said second exterior sheet and said first interior sheet.

7. The glazed unit according to claim 3, wherein said exterior seal is in contact with said interlayer face of the first interior sheet and/or said interior seal is in contact with said interlayer face of the second exterior sheet.

8. The glazed unit according to claim 3 wherein an additional portion of sheet of adhesive material is located between said exterior seal and said interior seal.

9. The glazed unit according to claim 1, wherein the means of transport is a vehicle.

10. The glazed unit according to claim 1, wherein said offset distance is between 10.0 and 90.0 mm.

11. The glazed unit according to claim 10, wherein said offset distance is between 15.0 and 70.0 mm.

12. The glazed unit according to claim 2, wherein said exterior face of said exterior seal is flush with said exterior face of the first exterior sheet and/or said exterior face of the second exterior sheet.

13. The glazed unit according to claim 3, wherein said interior face of said interior seal is flush with said interior face of the first interior sheet and/or said interior face of the second interior sheet.

14. A method for manufacturing a glazed unit for a means of transport, according to claim 1, said glazed unit having an exterior face intended to be oriented toward an exterior space and an interior face intended to be oriented toward an interior space, said glazed unit comprising:
   a first exterior sheet and a second exterior sheet, contiguous, each having an exterior face oriented toward said exterior space, an edge face facing each other with an exterior separation space therebetween, and an interlayer face,
   a first interior sheet and a second interior sheet, contiguous, each having an interlayer face, an edge face facing each other with an interior separation space therebetween, and an interior face oriented toward said interior space,
   at least one interlayer sheet of adhesive material located between one of said first and second exterior sheets and one of said first and second interior sheets,
   wherein, in order to produce, seen in cross-section, said exterior separation space and said interior separation space offset by an offset distance that is between 5.0 and 100.0 mm, the method comprises:
   making said interlayer sheet of adhesive material made from one piece and assembling said glazed unit by a single lamination operation, or arranging at least two interlayer sheets of adhesive material contiguous and assembling said glazed unit by two separate lamination operations or by a single lamination operation.

15. The method according to claim 14, wherein the means of transport is a vehicle.

* * * * *